United States Patent [19]

Kasano et al.

[11] Patent Number: 5,716,892
[45] Date of Patent: Feb. 10, 1998

[54] GLASS CLOTH CANVAS

[75] Inventors: Kanemi Kasano; Terufumi Suda; Tadataka Higashi; Syunsei Harada, all of Tokyo, Japan

[73] Assignee: Unitika Glass Fiber Co., Ltd., Kyoto, Japan

[21] Appl. No.: 629,546

[22] Filed: Apr. 9, 1996

[30] Foreign Application Priority Data

Apr. 28, 1995 [JP] Japan ..................... 7-127512

[51] Int. Cl.$^6$ .................... D06M 10/06; D06M 10/08
[52] U.S. Cl. ................. 442/60; 442/66; 442/68; 442/71; 442/73; 442/180
[58] Field of Search ............................. 442/60, 66, 68, 442/71, 73, 180

[56] References Cited

U.S. PATENT DOCUMENTS

| | | | |
|---|---|---|---|
| 4,214,026 | 7/1980 | Ibata et al. | 428/67 |
| 4,468,504 | 8/1984 | Kuemmel | 525/406 |
| 4,619,854 | 10/1986 | Penttinen | 428/99 |

*Primary Examiner*—Kathleen Choi
*Attorney, Agent, or Firm*—Larson & Taylor

[57] ABSTRACT

The glass cloth canvas of the present invention comprises a glass cloth having a mass of not less than 100 g/m$^2$ and a thickness of not less than 0.10 mm and surface-coated with one or more resins selected from acrylic, urethane and melamine resins in an amount of 10 g/m$^2$ or more.

6 Claims, No Drawings

GLASS CLOTH CANVAS

BACKGROUND OF THE INVENTION

The present invention relates to a glass cloth canvas suitable for painting a picture.

Heretofore, as a picture painting canvas, a canvas made of hemp etc., bast fiber, has mainly been used because it can be attached easily to a wooden frame and permits easy application of pigments thereto. However, a problem exists in the fragility of the hemp itself, and in order to remedy this point there has been adopted a method of applying an oil for priming coat to the canvas. But the use of such oil in a large quantity requires a considerably long period until the oil is dried, and in order for the canvas to be finished to a satisfactory extent it has been necessary for the canvas to be left standing at least two to three years.

Further, for using the canvas, it is stretched over a wooden frame and is affixed thereto with nails or the like. But the hygroscopicity of the hemp is relatively high, so if the canvas is left stretched on the wooden frame for a certain period, there will arise a slight looseness due to a delicate deformation of the hemp caused by a change in weather, thus resulting in a difference in the painting touch which is delicate at the time of painting a picture. Consequently, in the worst case, it is required to stretch the canvas several times repeatedly, which is very troublesome. Particularly, the larger the size of the picture painting canvas, the more the labor and time required for the canvas re-stretching work.

To avoid such repeated work, the operation for affixing a picture painting canvas to a wooden frame has heretofore been conducted on a highly humid day such as a rainy day. In this case, however, the operation can be done only on a highly humid day, that is, the work period until the time limit of the completion of a picture becomes shorter, thus causing compulsion in the work up to completion of the picture.

Besides, even with such effort, it has heretofore been impossible to fully prevent a delicate deformation caused by a change in weather.

Additionally, even if a picture is completed on the hemp canvas, if the canvas is kept in storage over a long period, there will occur cracks or worm-eaten spots due to the fragility inherent in the hemp and also due to the growth of mold which is a defect of organic fibers, or due to repeated deformations such as expansion and contraction of the hemp canvas caused by changes in humidity over a long period. Thus, it becomes impossible to store the completed picture for a long period.

SUMMARY OF THE INVENTION

It is an object of the present invention to provide a glass cloth canvas for painting a picture capable of eliminating the foregoing drawbacks of the prior art, having high strenth, capable of maintaining the stretched condition obtained at the time of being attached to a wooden frame, having the same texture as that of the conventional hemp canvas, permitting good touch of a paintbrush and high spreadability of pigments, and having resistance to worms and microorganisms.

The glass cloth canvas for painting a picture according to the present invention, which achieves the above-mentioned object, is characterized in that the surface of a glass cloth having a mass of not less than 100 g/m$^2$ and a thickness of not less than 0.10 mm is coated with one or more resins selected from acrylic resins, urethane resins and melamine resins in an amount of 10 g/m$^2$ or more.

DESCRIPTION OF THE PREFERRED EMBODIMENTS

The present invention will be described in detail hereinunder.

The glass cloth canvas of the present invention is produced by weaving glass filaments not larger than 7 μm, preferably not larger than 4 μm, in diameter.

It is desirable that the glass cloth have a plain weave because the plain weave has no directivity. It is necessary for the glass cloth to have a mass of not less than 100 g/m$^2$ and a thickness of not less than 0.10 mm. If the thickness of the glass cloth is smaller than 0.10 mm, the same cloth is apt to be wrinkled when stretched, and if the mass thereof is less than 100 g/m$^2$, the same cloth may be broken when stretched, resulting in that it is no longer possible to afford a satisfactory canvas for painting a picture.

Since the surfaces of the glass filaments used in the present invention are coated with one or more resins selected from acrylic resins, urethane resins and melamine resins in an amount of 10 g/m$^2$ or more, the canvas of the invention has a similar texture to that of the hemp, permits good touch of a paintbrush and satisfactory spreadability of a priming coat pigment, can always provide a uniform surface, and even when stretched onto a wooden frame, does not cause a localized tension only nailed portions, thus allowing tension to extend uniformly throughout the whole surface and preventing the occurrence of streaks caused by the localization of tension.

For the said coating there are used one or more resins selected from acrylic resins, urethane resins and melamine resins. Particularly, a blend of an acrylic resin and a urethane resin is preferred, with the blending ratio being preferably in the range of 3:7 to 7:3.

It is desirable that an inorganic substance be added to the above coating resin or resins in an amount of not more than 60 wt %, more preferably 30 to 40 wt %.

As preferred examples of the inorganic substance are mentioned powders of various inorganic substances, including calcium carbonate, glass powder, glass beads, glass flakes, natural mica, artificial mica, such oxides as silicon dioxide, titanium oxide and alumina, as well as such hydroxides as aluminum hydroxide.

The addition of an inorganic substance is effective in not only imparting a moderate white canvas gloss to the surface of the glass cloth but also creating a satisfactory touch of a paintbrush.

The above coating treatment can be effected, for example, by applying a synthetic resin solution to the glass cloth surface by spraying or dipping or using a knife coater and subsequent heating at 140° C. for 1 to 2 minutes. Particularly, the use of a knife coater is preferred because it permits uniform application of the solution over the glass cloth surface.

Since the glass cloth of the canvas according to the present invention is less hygroscopic, it does not undergo any delicate change even with change of the weather and hence there is no limitation on the day for mounting to a wooden frame; besides, the tension of the canvas obtained at the time of the mounting can be maintained as it is. Thus, the user of the canvas can devote himself to the picture painting work without being required to use labor and time for re-stretching the canvas.

Moreover, since the surface of the glass cloth having a mass of not less than 100 g/m$^2$ and a thickness of not less than 0.10 mm is coated with one or more resins selected from acrylic resins, urethane resins and melamine resins in an amount of 10 g/m² or more, the canvas of the invention has a texture similar to that of the conventional hemp canvas and permits satisfactory touch of a paintbrush and spreadability of a priming coat pigment.

Further, after completion a picture on the picture painting canvas of the present invention, there is no fear of mold growth on the canvas, or a deformation such as expansion or contraction of the canvas caused by changes in humidity over a long period, or cracking of the picture. Thus, it is possible to make a long-term storage of the picture.

EXAMPLE

The present invention will be described below by way of a working example, but it is to be understood that the invention is not limited thereto.

The surface of a glass cloth having a mass of 325 g/m² and a thickness of 0.26 mm was coated with 40 g/m² of a resin mixture comprising 15 parts by weight of an acrylic resin, 10 parts by weight of a urethane resin and 15 parts by weight of calcium carbonate, using a knife coater, and was then dried to afford a glass cloth canvas having a mass of 365 g/m² and a thickness of 0.30 mm.

The marginal portion of the canvas was affixed to a wooden frame with nails while the canvas was stretched, and the canvas was allowed to stand for six months. As a result, there was no change in the stretched state of the canvas. When this canvas was used, it exhibited a good elasticity for a paintbrush, and the spreadability of a priming coat pigment was very good to the same extent as that attained using a hemp canvas.

What is claimed is:

1. A glass cloth canvas comprising a glass cloth obtained by weaving glass filament not larger than 7 μm in diameter having a mass of not less than 100 g/m² and a thickness of not less than 0.10 mm, surface-coated with 10 g/m² or more of a composition comprising a blend of an acrylic resin and a urethane resin in a blend ratio of from 3:7 to 7:3 and no more than 60% by weight of an inorganic substance incorporated in one or more of said resins.

2. A glass cloth canvas according to claim 1, wherein said glass cloth is obtained by weaving glass filaments not larger than 4 μm in diameter.

3. A glass cloth canvas according to claim 1, wherein the amount of said inorganic substance is in the range of 30% to 40% by weight.

4. A glass cloth canvas according to claim 1, wherein said inorganic substance is an oxide.

5. A glass cloth canvas according to claim 1, wherein said inorganic substance is a hydroxide.

6. A glass cloth canvas according to claim 1, wherein said inorganic substance is constituted by one or more members selected from the group consisting of calcium carbonate, glass powder, glass beads, glass flakes, natural mica, artificial mica, silicon dioxide, titanium oxide, alumina, and aluminum hydroxide.

* * * * *